United States Patent [19]
Wagensonner et al.

[11] 3,804,505
[45] Apr. 16, 1974

[54] AUTOMATIC FOCUSSING ARRANGEMENT

[75] Inventors: Eduard Wagensonner; Ulrich K. Schmidt; Alois Rieder, all of Munich, Germany

[73] Assignee: AGFA-Gevaert AG, Leverkusen, Germany

[22] Filed: Aug. 11, 1971

[21] Appl. No.: 170,792

[30] Foreign Application Priority Data

Aug. 12, 1970 Germany............................ 2040011

[52] U.S. Cl. ............................................... 353/101
[51] Int. Cl. ............................................. G03b 3/00
[58] Field of Search............................... 353/101, 69

[56] References Cited

UNITED STATES PATENTS

| | | | |
|---|---|---|---|
| 3,536,392 | 10/1970 | Szymber | 353/101 |
| 3,494,694 | 2/1970 | Morita | 353/101 |

*Primary Examiner*—Harry N. Haroian
*Attorney, Agent, or Firm*—Michael S. Striker

[57] ABSTRACT

Mounted on a movable carriage are a light and a lens focussing the light onto the slide. Also mounted on the movable carriage are a first and second photoresistor series connected which receive light at the center portion when the light is properly focussed and unevenly over the two halves when it is improperly focussed. An error signal is derived from the unbalance in the two photo elements by connecting the center tap of the photo element to the commonly connected gates of an npn and pnp transistor whose emitters are connected in common to a motor winding whose other terminal is in turn connected to the center tap of a transformer furnishing line voltage. The emitter-collector circuits of the two transistors are connected across the transformer secondary via a bridge rectifier. The direction and magnitude of the current flow through motor winding determines the direction of movement of the carriage. The bridge rectifier output may also be used to energize the activating relay for the slide changing means.

10 Claims, 1 Drawing Figure

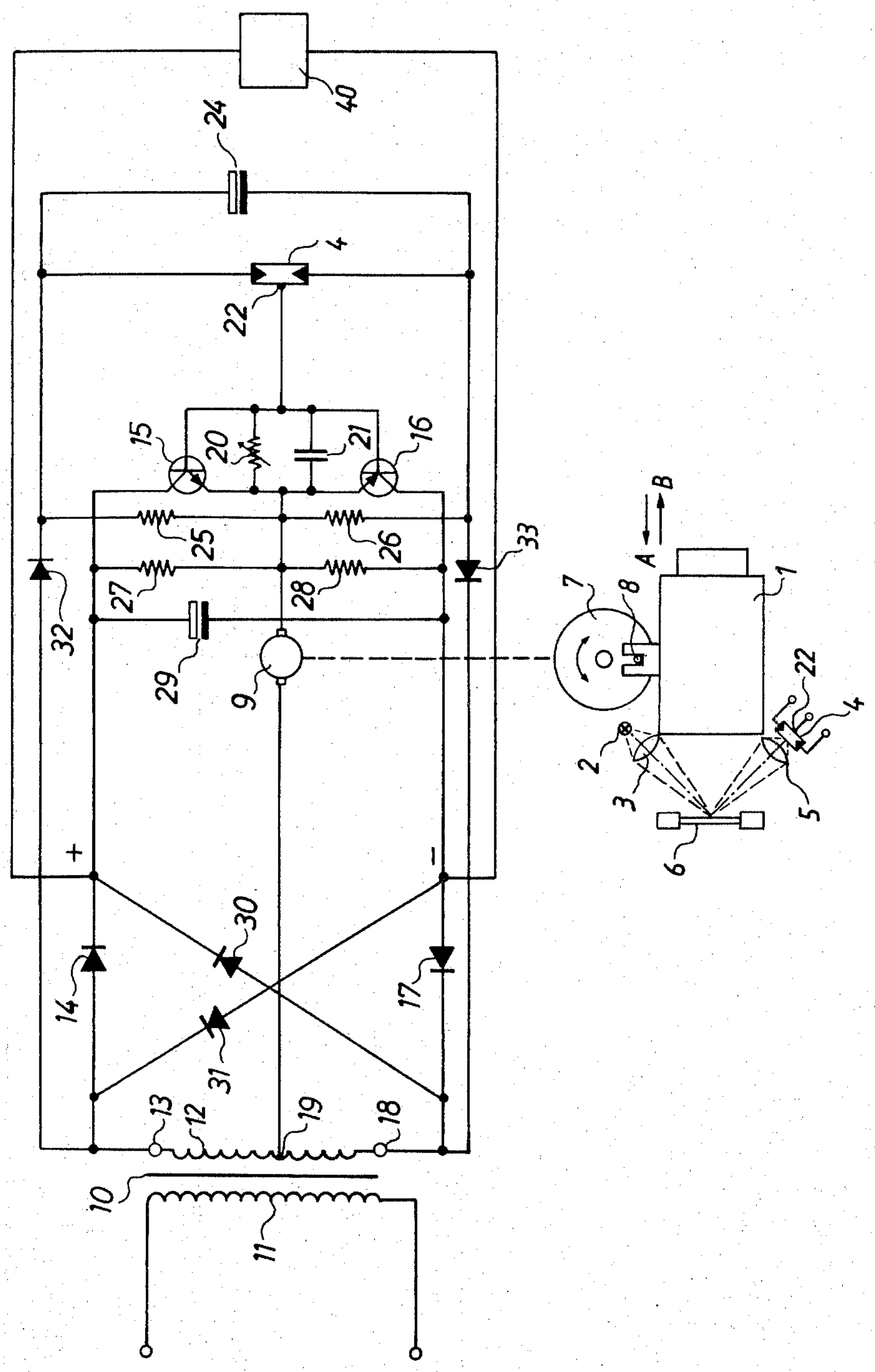
INVENTOR
EDUARD WAGENSONNER
BY ULRICH SCHMIDT
ALOIS RIEDER
[signature]
Attorney

AUTOMATIC FOCUSSING ARRANGEMENT

BACKGROUND OF THE INVENTION

The invention relates to an automatic focussing arrangement for maintaining the sharpness of projected slides. In particular, it relates to such automatic arrangements wherein a projection lamp and lens, as well as light sensitive elements receiving light impinged upon said slide and reflected therefrom, are all mounted on a movable carriage which is driven by a D.C. motor whose direction and magnitude of motion is determined by an error signal derived from the light sensitive element. The light sensitive element may comprise a first and second light sensitive element connected in series. Alternatively, it may comprise a single light sensitive element having a center tap. The center point of the light sensitive means is connected to the gates of a first and second transistor, the first of these transistors being an npn, and the second being a pnp type transistor. The emitters of these transistors are connected to a common output terminal, while the collector of each transistor is connected via a rectifier to respective extreme terminals of the secondary winding of a supply transformer.

In such known focussing arrangements, the light from the projection lamp, after focussing by the projection lens onto the slide, is projected from the slide onto the photosensitive element. Depending upon the position of the projection lens, the light will fall predominantly on one or the other side of the light sensitive element. If the light falls predominantly on one side, an error signal is derived whereby the motor tends to move the projection lens in a first direction, while light falling predominantly on the other side of the light sensitive element, causes a movement of the projection lens in the opposite direction.

The motor is stopped when the light falls in the center of the light sensitive means, that is when it falls between two series-connected light sensitive elements or in the vicinity of the center tap of a single light sensitive element. In known arrangements of this type, two additional transistors of opposite conductivity types are furnished in addition to the two above-mentioned transistors. These are connected in series of each other and in parallel to the above-mentioned transistors. The two directly connected emitters of the two additional transistors are connected to one side of the motor winding whose other motor winding terminal is connected to the center tap of the supply transformer.

SUMMARY OF THE INVENTION

It is an object of this invention to furnish an automatic focussing arrangement of the above type, but requiring fewer electronic components and having an increased sensitivity relative to the above-described arrangement.

In an arrangement in accordance with the present invention, the emitters of an npn and pnp transistor as described above, at whose gates the center tap of the light sensitive means is connected, are connected to one end of the motor winding whose other end is connected to the center tap of the secondary winding of the supply transformer. Further, the rectifiers connecting the collectors of the transistors to the extreme terminals of the secondary winding of the supply transformer in the known arrangement, are part of a bridge rectifier arrangement in the present invention. Thus, the collector of the npn transistor which, in the known arrangement, is connected to the cathode of a rectifier whose anode is connected to the first extreme terminal of the secondary winding of the supply transformer, is also connected to the cathode of a rectifier whose anode is connected to the second extreme terminal of the secondary winding of the supply transformer. Similarly, the collector of the pnp transistor is connected to the anode of a diode in the known arrangement whose cathode is connected to the second extreme terminal of the secondary winding of the supply transformer. In the present invention, it is further connected to the anode of a diode whose cathode is connected to the first extreme terminal of the primary winding of the supply transformer.

The use of such a bridge rectifier arrangement yields a further advantage that the transistors are furnished thereby with a D.C. voltage and that further every half-wave at the secondary winding of the supply transformer is utilized in the motor winding. The bridge rectifier serves as a full-wave rectifier for the motor winding. Under these conditions, the current in the motor winding is a pulsating D.C. current of twice line frequency. Thus the focussing arrangement of the present invention is more sensitive than that of the known arrangements. Further, it has the advantage that only two transistors are utilized.

It has been further found advantageous to connect the parallel combination of a damping resistance and a filter condensor between the gates and the emitters of the transistors. These serve to prevent overall oscillation of the control circuit. The filter can then cause to filter voltages of higher frequencies than line frequencies.

Another advantage of the use of a bridge rectifier arrangement is that the output of the bridge rectifier can also be used to activate or energize other parts of the slide projector, as for example, the electromagnetic switching means which control the slide changing mechanism.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic diagram of an arrangement of the present invention.

DESCRIPTION OF THE PREFERRED EMBODIMENT

The preferred embodiment of the present invention will now be described with reference to the drawing.

In the FIGURE, reference numeral 1 denotes a movable carriage whereon is mounted a projection lamp 2, constituting one embodiment of illuminating means, as well as a projection lens 3, constituting lens means. Further, light sensitive means 4 are mounted on the carriage. The light sensitive means in the present embodiment are a differential photo resistance having a center terminal 22. Reference numeral 6 denotes a slide. Light emanating from lamp 2 is focussed by lens 3 on slide 6 and reflected from slide 6 onto a lens 5 which serves to focus the light on photo resistance 4. The carriage 1 may be moved in the direction of the arrows A and B. Reference numeral 7 denotes a drive wheel which has an eccentric lug 8. Lug 8 cooperates with a forked extension of carriage 1. Wheel 7 is rotatably mounted on the shaft of a D.C. motor 9.

The supply transformer has a reference numeral 10 and comprises a primary winding 11 and a secondary winding 12. Secondary winding 12 has a first extreme terminal 13, a second extreme terminal 18, and a center tap 19. Terminal 13 is connected to the collector of a transistor 15 via a diode or rectifier 14. The emitter of transistor 15 is connected to the emitter of a transistor 16. Transistor 15 is an npn transistor, while transistor 16 is a pnp transistor. The collector of transistor 16 is connected to the anode of a diode 17 (second rectifier) whose cathode is connected to terminal 18. Further the collector of transistor 15 is connected to the cathode of a diode 30 (third rectifier) whose anode is connected to terminal 18 and the collector of transistor 16 is connected to the anode of a diode 31 (fourth rectifier) whose cathode is connected to terminal 13. The common emitter connection is herein referred as the common output point. It is connected to one terminal of the winding of motor 9 whose other terminal is connected to center tap 19 of the secondary winding of transformer 10. The gates of transistors 15 and 16 are connected in common to a center tap 22 of differential photo resistance 4. The extreme terminals of differential photo resistance 22 are respectively connected to terminals 13 and 18 via a rectifier 32 and 33 (fifth and sixth rectifiers). A damping resistance 20, indicated as a variable resistance, is connected in parallel with a filter condensor 21. This parallel circuit is connected between the emitters and gates of transistors 15 and 16. Further, a voltage divider comprising series-connected resistors 25 and 26 is connected from the cathode of diode 32 to the anode of diode 33 and has a center point connected to the common output point, namely the commonly-connected emitters of transistors 15 and 16. Further, a voltage divider comprising series-connected resistors 27 and 28 is connected from the collector of transistor 15 to the collector of transistor 16, the common point of resistors 27 and 28 being connected to the common output point. Resistors 25 and 26 allow adjustment of the arrangement for symmetry. Further, a capacitor 24 is connected in parallel with photo resistance 4. This serves as a filter capacitor.

An electromagnetic switching arrangement which activates the slide changing means, denoted by reference numeral 40, is connected to the output of the bridge rectifier.

The above-described arrangement operates as follows:

First let it be assumed that carriage 1 is in such a position that the light from lamp 2 falls predominantly on that half of photo resistance 4 adjacent to rectifier 32. Therefore the resistance of this half of the photo resistor is less compared to the resistance of the half adjoining rectifier 33. Thus the base of transistor 15 is positive relative to its emitter. Thus transistor 15 is conductive. The positive half-wave at terminal 13 of the secondary winding causes current to flow through rectifier 14 and through the winding of motor 9 to the center tap 19 of transformer secondary winding 12. The next half-wave of supply voltage is a positive wave at terminal 18 of secondary winding 12 and causes current to flow through rectifier 30, the collector-emitter circuit of transistor 14 and the winding of motor 9. Carriage 1 is therefore moved in the direction of arrow B which causes the focussed light to move towards center tap 22 of photo resistance 4. If the focussed light is exactly in the middle of differential photo resistance, transistor 15 has become sufficiently less conductive and transistor 16 sufficiently more conductive that no voltage difference exists between terminal 19 of secondary winding 12 and the emitters of transistors 15 and 16, and thus no more current flows through the winding of motor 9. Motor 9 thus stops for this position of carriage 1.

If the bundle of light is focussed in such a manner that photo resistance 4 receives light mainly on that half of the photo resistance adjoining rectifier 33, then the base of transistor 16 is negative relative to its emitter causing this transistor to become conductive. During the first half-wave of supply voltage, a current thus flows through terminal 19, through motor winding 9, through the emitter-collector circuit of transistor 16, through rectifier 17 to terminal 18. For the next half-wave, current flows from terminal 19 through motor winding 9, through the emitter-collector circuit of transistor 16, through rectifier 31 to terminal 13 of secondary winding 12 of transformer 10. The motor stops when, as previously, no voltage exists between the emitters of transistors 15 and 16, and center tap 19 of the secondary winding 12 of transformer 10.

If the voltage supplied to primary winding 11 has a frequency of 60 cycles per second, then the motor winding 9 receives a pulsating D.C. current of a frequency of 120 cycles per second. Use of the bridge rectifier thus gives the additional advantage, that the alternating current component appearing at transistors 15 and 16 is decreased relative to that appearing in the known arrangements.

While the invention has been illustrated and described as embodied in an automatic focussing arrangement, it is not intended to be limited to the details shown, since various modifications, structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a projector for projecting a slide, an automatic focusing arrangement, comprising, in combination, a movable carriage means; D.C. motor means having a winding, for moving said carriage means selectively in a first or second direction relative to said slide in dependence upon the direction of current flow through said winding; illuminating means for emitting light; focusing means focusing said light on said slide; light sensitive means having a first and second end terminal and a center terminal; means mounting said illuminating means, focusing means and light sensitive means in such a manner that light falls on that half of said light sensitive means included between said center terminal and said first end terminal when correct focusing requires movement of said carriage in said first direction and that light falls on that portion of said light sensitive means between said center terminal and said second end terminal when correct focusing requires movement of said carriage means in said second direction; means for furnishing an A.C. supply voltage, said means including transformer means having a secondary winding with a first and second end terminal and a center tap; full-wave bridge rectifier means connected to said secondary winding for rectifying said A.C. supply voltage thereby furnishing a D.C. voltage at a first and second D.C. output terminal; first and second amplifier means each having an output circuit and a control element; first connecting means connecting said output circuits in series at a common output point, and connecting the so connected output circuits to said first and second D.C. output terminal; second connecting means connecting said first and second end terminals of said light sensitive means to said first and second end terminals of said secondary winding of said transformer means, and connecting said center terminal of said light sensitive means to said control elements of said first and second amplifier means; and third connecting means connecting said winding of said motor between said common output point and said center tap of said secondary winding of said transformer means, whereby current flow through said winding of said motor during each half wave of said A.C. supply voltage and said D.C. voltage constitutes the operating voltage for said amplifier means.

2. An arrangement as set forth in claim 1, wherein said first and second amplifier means are, respectively, an npn and a pnp transistor, wherein said output circuit is emitter-collector circuit, and wherein said control element is the gate of each of said transistors.

3. An arrangement as set forth in claim 2, wherein said first connecting means comprise a direct connection from the emitter of said first transistor to the emitter of said second transistor.

4. An arrangement as set forth in claim 3, wherein said bridge rectifier means comprise a first diode having an anode connected to said first end terminal of said secondary winding of said transformer means and a cathode connected to the collector of said npn transistor, a second diode having an anode connected to the collector of said pnp transistor and a cathode connected to said second end terminal of said secondary winding, a third diode having an anode connected to said second end terminal and a cathode connected to the collector of said npn transistor, and fourth diode having an anode connected to the collector of said pnp transistor and a cathode connected to said first end terminal of said secondary winding of said transformer means.

5. An arrangement as set forth in claim 4, wherein said second connecting means comprise a fifth and sixth diode respectively interconnected between said first and second end terminal of said light sensitive means and said first and second end terminal of said secondary winding of said transformer means.

6. An arrangement as set forth in claim 4, further comprising damping resistance means connected between the gates of said transistors and the emitters of said transistors.

7. An arrangement as set forth in claim 6, further comprising filter condensor means connected in parallel with said damping resistance means.

8. An arrangement as set forth in claim 1, wherein said slide projector further comprises slide changing means; further comprising means for connecting said slide changing means to the output of said bridge rectifier.

9. An arrangement as set forth in claim 1, wherein said light sensitive means comprise a first and second light sensitive element connected in series.

10. An arrangement as set forth in claim 1, wherein said light sensitive means comprise a single light sensitive element having a center tap.

* * * * *